US012767738B2

(12) United States Patent
Suk et al.

(10) Patent No.: US 12,767,738 B2
(45) Date of Patent: Oct. 20, 2026

(54) METHOD OF PREPARING DIENE-BASED RUBBERY POLYMER AND METHOD OF PREPARING GRAFT POLYMER COMPRISING THE SAME

(71) Applicant: LG CHEM, LTD., Seoul (KR)

(72) Inventors: Jae Min Suk, Daejeon (KR); Young Hwan Jeong, Daejeon (KR); Yoo Vin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 491 days.

(21) Appl. No.: 18/291,500

(22) PCT Filed: Nov. 8, 2022

(86) PCT No.: PCT/KR2022/017471

§ 371 (c)(1),
(2) Date: Jan. 23, 2024

(87) PCT Pub. No.: WO2023/096220

PCT Pub. Date: Jun. 1, 2023

(65) Prior Publication Data

US 2024/0376235 A1 Nov. 14, 2024

(30) Foreign Application Priority Data

Nov. 25, 2021 (KR) ........................ 10-2021-0164269

(51) Int. Cl.

*C08F 136/06* (2006.01)
*C08F 2/26* (2006.01)
*C08F 2/44* (2006.01)
*C08F 279/04* (2006.01)

(52) U.S. Cl.

CPC .............. *C08F 136/06* (2013.01); *C08F 2/26* (2013.01); *C08F 2/44* (2013.01); *C08F 279/04* (2013.01); *C08F 2400/02* (2013.01)

(58) Field of Classification Search

USPC ........................................ 526/229.5; 525/273
See application file for complete search history.

(56) References Cited

U.S. PATENT DOCUMENTS

| | | | |
|---|---|---|---|
| 2005/0154156 | A1 | 7/2005 | Karato et al. |
| 2011/0224351 | A1 | 9/2011 | Mori et al. |
| 2015/0119528 | A1 | 4/2015 | Liang et al. |
| 2016/0009911 | A1 | 1/2016 | Senga et al. |
| 2016/0229927 | A1 | 8/2016 | Motoda et al. |
| 2017/0327619 | A1 | 11/2017 | Suk et al. |
| 2017/0349689 | A1 | 12/2017 | Kim et al. |
| 2022/0169770 | A1 | 6/2022 | Bak et al. |

FOREIGN PATENT DOCUMENTS

| | | | |
|---|---|---|---|
| CN | 101423585 | A | 5/2009 |
| CN | 101880364 | A | 11/2010 |
| CN | 102239194 | A | 11/2011 |
| CN | 102952237 | A | 3/2013 |
| CN | 107001514 | A | 8/2017 |
| CN | 111386290 | A | 7/2020 |
| CN | 113544171 | A | 10/2021 |
| EP | 3235841 | A1 | 10/2017 |
| JP | H07-002821 | B2 | 1/1995 |
| JP | H10-139841 | A | 5/1998 |
| JP | 5319041 | B2 | 1/2002 |
| JP | 2017-117597 | A | 6/2017 |
| KR | 10-2002-0094468 | A | 12/2002 |
| KR | 10-2004-0091123 | A | 10/2004 |
| KR | 10-0806123 | B1 | 2/2008 |
| KR | 10-2015-0048083 | A | 5/2015 |
| KR | 10-2015-0140856 | A | 12/2015 |
| KR | 10-2016-0006662 | A | 1/2016 |
| KR | 10-2016-0071249 | A | 6/2016 |

OTHER PUBLICATIONS

Machine-generated translation of Detailed Description of CN 101423585A, 39 pages, published May 6, 2009, retrieved from Espacenet on Jul. 17, 2026. (Year: 2009).*
Machine-generated translation of Detailed Description of JP 2017117597A, 114 pages, published Jun. 29, 2017, retrieved from Espacenet on Jul. 17, 2026. (Year: 2017).*
International Search Report (with partial translation) and Written Opinion dated Feb. 20, 2023, for corresponding International Patent Application No. PCT/KR2022/017471.
Office Action dated Mar. 13, 2026 issued in the corresponding Chinese Patent Application No. 202280050732.4. (Note: CN101423585A, JP2017117597A, CN101880364A, CN102952237A, and EP3235841A1 already submitted.).
Extended European Search Report issued in corresponding European Patent Application No. 22898902.6, dated Sep. 30, 2024. (Note: KR 10-2016-0071249 A, CN 101423585 A, JP 2017-117597 A and CN 102952237 A were previously cited).

* cited by examiner

*Primary Examiner* — Fred M Teskin
(74) *Attorney, Agent, or Firm* — Morgan, Lewis & Bockius LLP

(57) ABSTRACT

The present invention relates to a method of preparing a diene-based rubbery polymer, comprising initiating and performing polymerization of monomers in the presence of an amine-based compound and a thermal decomposition initiator, wherein the amine-based compound is one or more selected from the group consisting of a compound represented by Chemical Formula 1 and a compound represented by Chemical Formula 2, a content of the amine-based compound is 0.03 to 0.70 parts by weight, based on 100 parts by weight of the total amount of monomers added during preparation of the diene-based rubbery polymer, the monomer may be a diene-based monomer, or a diene-based monomer and a vinyl aromatic monomer, and the polymerization is initiated at 25 to 50° C.

16 Claims, No Drawings

(56) References Cited

OTHER PUBLICATIONS

METHOD OF PREPARING DIENE-BASED RUBBERY POLYMER AND METHOD OF PREPARING GRAFT POLYMER COMPRISING THE SAME

TECHNICAL FIELD

Cross-Citation with Related Applications

The present invention claims the benefit of priority based on Korean Patent Application No. 10-2021-0164269 filed on Nov. 25, 2021, and all contents published in the literature of the Korean patent application are incorporated as a part of this specification.

TECHNICAL FIELD

The present invention relates to a method of preparing a diene-based rubbery polymer and a method of preparing a graft polymer comprising the method of preparing a diene-based rubbery polymer, and more specifically, to a method of preparing a diene-based rubbery polymer having excellent polymerization stability and excellent impact resistance while significantly lowering a polymerization initiation temperature due to synergy between a diamine-based compound and a thermal decomposition initiator, and a method of preparing a graft polymer comprising the method of preparing a diene-based rubbery polymer.

BACKGROUND ART

In the case of a diene-based graft copolymer prepared by emulsion polymerization, a redox initiation system is most widely used as a polymerization initiation system. The redox initiation system has the advantage of being able to control the polymerization in a relatively short time because the polymerization initiation temperature is low and the polymerization rate is high.

However, the redox initiation system may reduce polymerization stability during preparation of the diene-based rubbery polymer due to a metal oxide and a reducing agent, and an excessive amount of the diene-based rubbery polymer having a small particle diameter may be prepared depending on the amount of diene-based rubbery polymer used. In order to solve this problem, there has been an attempt to use a thermal decomposition initiator such as potassium persulfate, but the polymerization initiation and performance temperature is high, the polymerization rate is low, and polymerization stability is likely to be lowered due to high reaction pressure resulting from high polymerization initiation and performance temperature. In addition, there is a problem in that processability and impact resistance of the graft polymer are deteriorated because rubber efficiency is deteriorated due to an increase in a crosslinking rate of a rubbery polymer.

Accordingly, research on a method of preparing a diene-based rubbery polymer having a low polymerization initiation temperature, a high polymerization rate, and excellent physical properties is being continued.

DISCLOSURE

Technical Problem

The problem to be solved by the present invention is to provide a method of preparing a diene-based rubbery polymer having a low polymerization initiation temperature, excellent polymerization stability, and excellent impact resistance even when a thermal decomposition initiator is used, and a method of preparing a graft polymer comprising the method of preparing a diene-based rubbery polymer.

Technical Solution

In order to solve the problems, (1) the present invention provides a method of preparing a diene-based rubbery polymer, comprising initiating and performing polymerization of monomers in the presence of an amine-based compound and a thermal decomposition initiator, wherein the amine-based compound is one or more selected from the group consisting of a compound represented by Chemical Formula 1 and a compound represented by Chemical Formula 2, a content of the amine-based compound is 0.03 to 0.70 parts by weight, based on 100 parts by weight of the total amount of monomers added during preparation of the diene-based rubbery polymer, the monomer is a diene-based monomer, or a diene-based monomer and a vinyl aromatic monomer, and the polymerization is initiated at 25 to 50° C.:

[Chemical Formula 1]

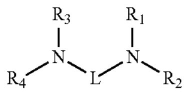

in Chemical Formula 1, $R_1$ to $R_4$ are each independently hydrogen or a $C_1$ to $C_{10}$ alkyl group, L is a $C_1$ to $C_{10}$ alkylene group,

[Chemical Formula 2]

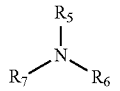

in Chemical Formula 2, $R_5$ to $R_7$ are each independently hydrogen or a $C_1$ to $C_5$ alkyl group, but two or more of $R_5$ to $R_7$ are a $C_1$ to $C_5$ alkyl group.

(2) The present invention also provides the method of preparing a diene-based rubbery polymer according to (1), wherein the compound represented by Chemical Formula 1 is one or more selected from the group consisting of N,N,N',N'-tetramethylethylenediamine and ethylenediamine.

(3) The present invention also provides the method of preparing a diene-based rubbery polymer according to (1) or (2), wherein the compound represented by Chemical Formula 2 is dimethylamine.

(4) The present invention also provides the method of preparing a diene-based rubbery polymer according to any one of (1) to (3), wherein the thermal decomposition initiator is one or more selected from the group consisting of potassium persulfate, sodium persulfate, and ammonium persulfate.

(5) The present invention also provides the method of preparing a diene-based rubbery polymer according to any one of (1) to (4), wherein the polymerization is initiated at 25 to 35° C.

(6) The present invention also provides the method of preparing a diene-based rubbery polymer according to any one of (1) to (5), wherein a content of the thermal decomposition initiator is 0.01 to 3.00 parts by weight, based on 100 parts by weight of the total amount of monomers added during preparation of the diene-based rubbery polymer.

(7) The present invention also provides the method of preparing a diene-based rubbery polymer according to any one of (1) to (6), wherein the initiating and performing of the polymerization of the monomers comprises: initiating the polymerization of the monomers in the presence of the amine-based compound and the thermal decomposition initiator; and adding and polymerizing the monomers at a polymerization conversion rate of 10 to 50%.

(8) The present invention also provides the method of preparing a diene-based rubbery polymer according to (7), wherein a content of the monomers added in the initiating of the polymerization of the monomers is 50 to 90 parts by weight, based on 100 parts by weight of the total amount of monomers added during preparation of the diene-based rubbery polymer, and a content of the monomers added in the performing of the polymerization is 10 to 50 parts by weight, based on 100 parts by weight of the total amount of monomers added during preparation of the diene-based rubbery polymer.

(9) The present invention also provides the method of preparing a diene-based rubbery polymer according to any one of (1) to (8), wherein the polymerization may be emulsion polymerization.

(10) The present invention also provides a method of preparing a graft polymer, comprising: preparing a diene-based rubbery polymer by the method of preparing according to any one of (1) to (9); and polymerizing a vinyl aromatic monomer and a vinyl cyanide-based monomer to the diene-based rubbery polymer.

Advantageous Effects

According to a method of preparing a diene-based rubbery polymer of the present invention, polymerization can be initiated and performed at a relatively low temperature even when a thermal decomposition initiator is used, and polymerization stability is excellent and thus production efficiency can be significantly improved. In addition, a graft polymer having excellent impact resistance can be prepared.

Modes of the Invention

Hereinafter, the present invention will be described in more detail to help the understanding of the present invention.

At this time, the terms or words used in the specification and claims should not be interpreted as being limited to conventional or dictionary meanings, and the terms or words should be interpreted as a meaning and a concept that are consistent with the technical concept of the present invention based on the principle that the inventor can appropriately define the concepts of terms in order to explain his/her own invention in the best way.

In the present invention, "polymerization conversion rate" indicates the degree to which monomers polymerize to form a polymer, and may be calculated by the following formula:

Polymerization conversion rate (%)={(total weight of monomers added until polymerization is completed)−(total weight of unreacted monomers at the time when polymerization conversion rate is measured)}/(total weight of monomers added until polymerization is completed)×100

In the present invention, "average particle diameter" may mean an arithmetic average particle diameter in a particle size distribution measured by dynamic light scattering, specifically, an average particle diameter of scattering intensity. The average particle diameter may be measured using Nicomp 370HPL equipment (product name, manufacturer: PSS Nicomp).

In the present invention, "gel content" may be calculated after preparing a section by coagulating, washing, and drying a diene-based rubbery polymer latex, and then separating the section into a sol and a gel.

Specifically, the diene-based rubbery polymer latex may be coagulated with a dilute aqueous solution of sulfuric acid and then washed. The washed material may be primarily dried in a vacuum oven at 60° C. for 24 hours, and then cut with scissors to prepare sections. 1 g of these sections may be put in 100 g of toluene, stored in a dark room at 23° C. for 48 hours, separated into a sol and gel, and after secondary drying of the gel in an oven at 85° C. for 6 hours, the secondarily dried material may be weighed, and a gel content may be calculated by introducing it into the following equation:

Gel content (% by weight)=(weight of secondarily dried material)/(weight of section used in preparing secondarily dried material)×100

In the present invention, "diene-based monomer" may be one or more selected from the group consisting of 1,3-butadiene, isoprene, chloroprene, and piperylene, of which 1,3-butadiene is preferable.

In the present invention, the "vinyl aromatic monomer" may be one or more selected from the group consisting of styrene, α-methyl styrene, α-ethyl styrene, and p-methyl styrene, of which styrene is preferable.

In the present invention, the "vinyl cyanide-based monomer" may be one or more selected from the group consisting of acrylonitrile, methacrylonitrile, phenylacrylonitrile, and α-chloroacrylonitrile, of which acrylonitrile is preferable.

In the present invention, the "molecular weight modifier" may be one or more selected from the group consisting of an α-methyl styrene dimer, t-dodecyl mercaptan, n-dodecyl mercaptan, t-octyl mercaptan, n-octyl mercaptan, carbon tetrachloride, methylene chloride, methylene bromide, tetraethyl thiuram disulfide, dipentamethylene thiuram disulfide, and diisopropylxantogen disulfide. Among these, t-dodecyl mercaptan is preferred.

In the present invention, the "peroxide-based initiator" may be one or more selected from the group consisting of cumene hydroperoxide, diisopropyl benzene hydroperoxide, t-butyl hydroperoxide, paramenthane hydroperoxide, and benzoyl peroxide.

In the present invention, the "azo-based initiator" may be azobisisobutyronitrile.

In the present invention, the "emulsifier" may be one or more selected from the group consisting of sodium dicyclohexyl sulfosuccinate, sodium dihexyl sulfosuccinate, sodium di-2-ethylhexyl sulfosuccinate, potassium di-2-ethylhexyl sulfosuccinate, sodium dioctyl sulfosuccinate, sodium dodecyl sulfate, sodium dodecyl benzene sulfate, sodium octadecyl sulfate, sodium oleyl sulfate, potassium octadecyl sulfate, potassium rosinate, and sodium rosinate, and among these, sodium dodecyl benzene sulfonate is preferred.

In the present invention, the "electrolyte" may be one or more selected from the group consisting of KCl, NaCl, KOH, $KHCO_3$, $NaHCO_3$, $K_2CO_3$, $Na_2CO_3$, $KHSO_3$, $NaHSO_3$, $K_4P_2O_7$, $NaP_2O_7$, $K_3PO_4$, $Na_3PO_4$, $K_2HPO_4$, and $Na_2HPO_4$, and among these, one or more selected from the group consisting of KOH and $K_2CO_3$ are preferred.

In the present invention, the "oxidation-reduction-based catalyst" may be one or more selected from the group consisting of sodium formaldehyde sulfoxylate, sodium ethylenediamine tetraacetate, iron (II) sulfate, dextrose, tetrasodium pyrophosphate, anhydrous sodium pyrophosphate, and sodium sulfate, and among these, one or more selected from the group consisting of iron (II) sulfate, dextrose, and tetrasodium pyrophosphate are preferred.

In the present invention, the "aqueous solvent" may be ion-exchanged water or distilled water.

In the present invention, the "alkyl group" may be one or more selected from the group consisting of a methyl group, an ethyl group, a propyl group, an n-propyl group, an isopropyl group, a butyl group, an n-butyl group, an isobutyl group, a tert-butyl group, a sec-butyl group, a 1-methyl-butyl group, a 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, a 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethyl-propyl group, a 1,1-dimethyl-propyl group, an isohexyl group, a 2-methylpentyl group, a 4-methylhexyl group, a 5-methylhexyl group, and 3-methyloctan-2-yl.

In the present invention, the "alkylene group" may mean that the alkyl group has two bonding sites, that is, a divalent group.

1. Preparation of Diene-Based Rubbery Polymer

A method of preparing a diene-based rubbery polymer according to an embodiment of the present invention comprises initiating and performing polymerization of monomers in the presence of an amine-based compound and a thermal decomposition initiator, wherein the amine-based compound is one or more selected from the group consisting of a compound represented by Chemical Formula 1 and a compound represented by Chemical Formula 2, a content of the amine-based compound is 0.03 to 0.70 parts by weight, based on 100 parts by weight of the total amount of monomers added during preparation of the diene-based rubbery polymer, the monomer is a diene-based monomer, or a diene-based monomer and a vinyl aromatic monomer, and the polymerization is initiated at 25 to 50° C.:

[Chemical Formula 1]

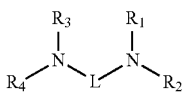

in Chemical Formula 1, $R_1$ to $R_4$ are each independently hydrogen or a $C_1$ to $C_{10}$ alkyl group, L is a $C_1$ to $C_{10}$ alkylene group.

[Chemical Formula 2]

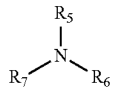

in Chemical Formula 2, $R_5$ to $R_7$ are each independently hydrogen or a $C_1$ to $C_5$ alkyl group, but two or more of $R_5$ to $R_7$ are a $C_1$ to $C_5$ alkyl group.

When polymerization is initiated in the presence of an amine-based compound and a thermal decomposition initiator in the method of preparing a diene-based rubbery polymer, polymerization can be initiated and performed at a relatively low temperature even when the thermal decomposition initiator is used due to synergy between the amine-based compound and the thermal decomposition initiator, polymerization stability is excellent and thus production efficiency can be significantly improved, and a graft polymer having excellent impact resistance can be prepared.

In Chemical Formula 1, $R_1$ to $R_4$ may each be independently hydrogen or a $C_1$ to $C_4$ alkyl group, and L may be a $C_1$ to $C_4$ alkylene group.

The compound represented by Chemical Formula 1 may be one or more selected from the group consisting of N,N,N',N'-tetramethylethylenediamine and ethylenediamine.

In Chemical Formula 2, $R_5$ to $R_7$ are each independently hydrogen or a $C_1$ to $C_5$ alkyl group, but two or more of $R_5$ to $R_7$ are a $C_1$ to $C_5$ alkyl group, and $R_5$ to $R_7$ are each independently hydrogen or a $C_1$ to $C_4$ alkyl group, but one or more of $R_5$ to $R_7$ are preferably hydrogen. When an alkyl group exceeding $C_5$ is introduced, since a molecular weight of the compound increases, a nitrogen content is reduced compared to an addition amount of the compound, and an effect is remarkably lowered.

The compound represented by Chemical Formula 2 may be dimethylamine.

The content of the amine-based compound may be 0.03 to 0.70 parts by weight, preferably 0.10 to 0.50 parts by weight, based on 100 parts by weight of the total amount of monomers added during preparation of the diene-based rubbery polymer. When the content of the amine-based compound is smaller than the above-described conditions, polymerization is not initiated at 25 to 50° C. When the content of the amine-based compound exceeds the above-described conditions, polymerization stability is lowered, and the coagulum is excessively generated, thereby lowering production efficiency.

Unlike the redox initiation system, since the thermal decomposition initiator does not require use of a metal oxide and a reducing agent together, deterioration of thermal stability and whitening of the graft polymer can be prevented. The thermal decomposition initiator may be one or more selected from the group consisting of potassium persulfate, sodium persulfate, and ammonium persulfate, and potassium sulfate is preferred from the viewpoint of price and polymerization stability.

A content of the thermal decomposition initiator may be 0.01 to 3.00 parts by weight, preferably 0.10 to 0.80 parts by weight, based on 100 parts by weight of the total amount of monomers added during preparation of the diene-based rubbery polymer. When the above-described condition is satisfied, the polymerization rate and polymerization stability can be balanced.

Since polymerization of monomers is initiated in the presence of the amine-based compound and the thermal decomposition initiator, the polymerization may be initiated at 25 to 50° C., preferably at 25 to 35° C. When the above-described condition is satisfied, the energy required to raise the temperature of a reactor can be saved, and thus polymerization efficiency can be improved. In addition, since the amount of coagulation is reduced during preparation of the diene-based rubbery polymer and the final polymerization conversion rate is increased, polymerization stability and polymerization efficiency may be improved. Polymerization is not initiated below the temperature mentioned above. In addition, when polymerization is initiated at a temperature exceeding the above-described temperature, excessive energy is consumed to raise the temperature of the reactor, and polymerization is initiated and performed at a high temperature, and thus the polymerization pressure is increased, the crosslinking degree of the diene-based rubbery polymer is increased, and gel content is increased, and as a result, impact resistance of the diene-based rubbery polymer is lowered.

The polymerization may be emulsion polymerization, and may be performed in the presence of one or more selected from the group consisting of an emulsifier, an electrolyte, a molecular weight modifier, and an aqueous solvent, as well as the amine-based compound and the thermal decomposition initiator.

The type of emulsifier is as described above, and a content of the emulsifier may be 0.5 to 5.0 parts by weight, preferably 0.8 to 2.5 parts by weight, based on 100 parts by weight of the total amount of monomers added during preparation of the diene-based rubbery polymer, and when the above-described condition is satisfied, not only a diene-based rubbery polymer having a desired size can be prepared, but also polymerization stability can be improved.

The type of electrolyte is as described above, and a content of the electrolyte may be 0.3 to 3.0 parts by weight, preferably 0.5 to 1.5 parts by weight, based on 100 parts by weight of the total amount of monomers added during preparation of the diene-based rubbery polymer, and when the above-described condition is satisfied, polymerization stability can be improved.

The type of molecular weight modifier is as described above, and a content of the molecular weight modifier may be 0.1 to 1.0 part by weight, preferably 0.2 to 0.5 parts by weight, based on 100 parts by weight of the total amount of monomers added during preparation of the diene-based rubbery polymer, and when the above-described condition is satisfied, the preparation time of the diene-based rubbery polymer can be shortened.

Meanwhile, the initiating and performing of the polymerization of the monomers may comprise initiating polymerization of the monomers in the presence of the amine-based compound and the thermal decomposition initiator, and adding and polymerizing the monomers at a polymerization conversion rate of 10 to 50%.

When the monomers are added at a polymerization conversion rate of 10 to 50%, preferably at a polymerization conversion rate of 20 to 40%, the polymerization pressure and polymerization temperature do not rise rapidly and polymerization stability can be improved to prepare a diene-based rubbery polymer having a desired average particle diameter.

The content of the monomers added in the initiating the polymerization of the monomers may be 50 to 90 parts by weight, preferably 60 to 80 parts by weight, based on 100 parts by weight of the total amount of monomers added during preparation of the diene-based rubbery polymer, and in addition, a content of the monomers added in the polymerizing may be 10 to 50 parts by weight, preferably 20 to 40 parts by weight, based on 100 parts by weight of the total amount of monomers added during preparation of the diene-based rubbery polymer, and when the above-described condition is satisfied, polymerization stability can be improved.

In addition, the initiating and performing of the polymerization of the monomers may comprise initiating the polymerization of the monomers in the presence of the amine-based compound and the thermal decomposition initiator, and performing the polymerization while continuously adding the monomers from a polymerization conversion rate of 10 to 30% to a polymerization conversion rate of 40 to 70%.

When the monomers are continuously added from the point where the polymerization conversion rate is 10 to 30% to the point where the polymerization conversion rate is 40 to 70%, preferably from the point where the polymerization conversion rate is 10 to 20% to the point where the polymerization conversion rate is 50 to 70%, it is possible to improve polymerization stability and latex stability by preventing the rapid progress of polymerization, which is a problem that occurs when the monomers are collectively added before polymerization initiation. In addition, the generation of coagulum can be minimized, and thus production efficiency can be improved. In addition, since the stability of the diene-based rubbery polymer is improved, graft polymerization may proceed smoothly during preparation of the graft polymer.

The content of the monomers added in the initiating of the polymerization of the monomers may be 50 to 90 parts by weight, preferably 60 to 80 parts by weight, based on 100 parts by weight of the total amount of monomers added during preparation of the diene-based rubbery polymer. In addition, a content of the monomers continuously added in the polymerizing may be 10 to 50 parts by weight, preferably 20 to 40 parts by weight, based on 100 parts by weight of the total amount of monomers added during preparation of the diene-based rubbery polymer, and when the above-described condition is satisfied, polymerization stability can be improved.

The diene-based rubbery polymer may have an average particle diameter of 50 to 500 nm and a gel content of 60 to 85% by weight, preferably an average particle diameter of 100 to 400 nm and a gel content of 65 to 80% by weight. When the above-described conditions are satisfied, a graft polymer with remarkably improved impact resistance can be prepared.

2. Preparation Method of Graft Polymer

A method of preparing a graft polymer according to another embodiment of the present invention comprises preparing a diene-based rubbery polymer by the preparation method according to an embodiment of the present invention, and polymerizing a vinyl aromatic monomer and a vinyl cyanide-based monomer to the diene-based rubbery polymer.

The diene-based rubbery polymer may be in a form of latex dispersed in water in a colloidal state.

A content of the diene-based rubbery polymer may be 45 to 75 parts by weight, preferably 50 to 70 parts by weight, based on 100 parts by weight of the total content of the diene-based rubbery polymer, the vinyl aromatic monomer, and the vinyl cyanide-based monomer. When the above-described range is satisfied, impact resistance and processability of the graft polymer can be further improved.

A content of the vinyl aromatic monomer may be 15 to 45 parts by weight, preferably 20 to 40 parts by weight, based on 100 parts by weight of the total content of the diene-based rubbery polymer, the vinyl aromatic monomer, and the vinyl cyanide-based monomer. When the above-described range is satisfied, chemical resistance, rigidity, impact resistance, processability, and surface gloss of the graft polymer can be further improved.

A content of the vinyl cyanide-based monomer may be 1 to 20 parts by weight, preferably 3 to 17 parts by weight, based on 100 parts by weight of the total content of the diene-based rubbery polymer, the vinyl aromatic monomer, and the vinyl cyanide-based monomer. When the above-described range is satisfied, chemical resistance, rigidity, impact resistance, processability, and surface gloss of a thermoplastic resin composition can be further improved.

The polymerization may be performed in the presence of one or more selected from the group consisting of an emulsifier, an initiator, an oxidation-reduction-based catalyst, a molecular weight modifier, and ion-exchanged water.

A content of the emulsifier may be 0.01 to 2.00 parts by weight or 0.10 to 0.60 parts by weight, based on 100 parts by weight of the total content of the diene-based rubbery polymer, the vinyl aromatic monomer, and the vinyl cyanide-based monomer, and among these, it is preferably 0.10 to 1.50 parts by weight. When the above-described range is satisfied, emulsion polymerization is easily performed, polymerization stability and latex stability can be improved, and a residual amount in the graft polymer can be minimized.

A content of the initiator may be 0.010 to 1.000 parts by weight or 0.100 to 0.500 parts by weight, based on 100 parts by weight of the total content of the diene-based rubbery polymer, the vinyl aromatic monomer, and the vinyl cyanide-based monomer, and among these, it is preferably 0.100 to 0.500 parts by weight. When the above-described range is satisfied, emulsion polymerization can be easily performed, and a residual amount in the graft polymer can be minimized.

A content of the oxidation-reduction-based catalyst may be 0.0100 to 0.5000 parts by weight or 0.0500 to 0.4000 parts by weight, based on 100 parts by weight of the total content of the diene-based rubbery polymer, the vinyl aromatic monomer, and the vinyl cyanide-based monomer, and among these, it is preferably 0.500 to 0.4000 parts by weight. When the above-described range is satisfied, the polymerization conversion rate can be further increased.

A content of the molecular weight modifier may be added in an amount of 0.01 to 1.00 parts by weight or 0.05 to 0.50 parts by weight, based on 100 parts by weight of the total content of the diene-based rubbery polymer, the vinyl aromatic monomer, and the vinyl cyanide-based monomer, and among these, it is preferably added in an amount of 0.05 to 0.50 parts by weight. When the above-described range is satisfied, a weight average molecular weight of a shell can be appropriately adjusted.

3. Thermoplastic Resin Composition

A thermoplastic resin composition according to still another embodiment of the present invention comprises a graft polymer prepared according to another embodiment of the present invention and a non-grafted polymer comprising a vinyl aromatic monomer unit and a vinyl cyanide monomer unit.

The non-grafted polymer may impart heat resistance, rigidity, and processability to the thermoplastic resin composition.

The non-grafted polymer may comprise the vinyl aromatic monomer unit and the vinyl cyanide monomer unit in a weight ratio of 85:15 to 60:40, preferably 80:20 to 65:35. When the above-described range is satisfied, the thermoplastic resin composition can better achieve a balance of heat resistance, impact resistance, and processability.

A weight ratio of the graft polymer and the non-grafted polymer may be 15:85 to 35:65, preferably 20:80 to 30:70. When the above-described range is satisfied, chemical resistance, impact resistance, thermal stability, colorability, fatigue resistance, rigidity, and processability of a molded article made of the thermoplastic resin composition can be further improved.

Hereinafter, embodiments of the present invention will be described in detail so that those of ordinary skill in the art can easily carry out the present invention. However, the present invention may be embodied in many different forms and is not limited to the embodiments set forth herein.

EXAMPLE 1

<Preparation of Diene-Based Rubbery Polymer>

55 parts by weight of ion-exchanged water, 70 parts by weight of 1,3-butadiene, 0.03 parts by weight of N,N,N',N'-tetramethylethylenediamine, 0.30 parts by weight of potassium persulfate, 1.0 part by weight of potassium rosinate, 1.0 part by weight of potassium oleate, 1.5 parts by weight of potassium carbonate, and 0.5 parts by weight of t-dodecyl mercaptan were added into a nitrogen-purged reactor. Then, the temperature of the reactor was raised to 25° C., the pressure of the reactor was set to 5 kg/cm$^2$, and then polymerization was initiated. The polymerization was performed while raising the temperature of the reactor at a constant rate to 35° C. at the same time as the polymerization was initiated. When a polymerization conversion rate was 20%, 30 parts by weight of 1,3-butadiene and 0.2 parts by weight of potassium rosinate were added, and then polymerized. At the time when the polymerization conversion rate was 50%, the temperature of the reactor was raised to 50° C., the polymerization was performed for 10 hours, and the polymerization was terminated to prepare a diene-based rubbery polymer latex.

<Preparation of Graft Polymer>

A monomer mixture comprising 30 parts by weight of styrene, 10 parts by weight of acrylonitrile, 100 parts by weight of ion-exchanged water, 0.05 parts by weight of t-butyl hydroperoxide, 0.5 parts by weight of potassium rosinate and 0.5 parts by weight of t-dodecyl mercaptan was prepared.

Then, an activator mixture comprising 0.0100 parts by weight of dextrose, 0.0100 parts by weight of tetrasodium pyrophosphate, and 0.0010 parts by weight of iron (II) sulfate was prepared.

60 parts by weight (based on solid content) of the diene-based rubbery polymer latex and 10 parts by weight of ion-exchanged water were added into a nitrogen-purged reactor, and then the temperature of the reactor was raised to 55° C. Polymerization was performed while continuously adding the monomer mixture and the activator mixture into the reactor for 2 hours. After the continuous addition was completed, 0.0050 parts by weight of dextrose, 0.0050 parts by weight of tetrasodium pyrophosphate, 0.0005 parts by weight of iron (II) sulfate, and 0.1 parts by weight of t-butyl hydroperoxide were added into the reactor, and the temperature of the reactor was raised to 80° C. for 1 hour, and then the polymerization was terminated to prepare a graft polymer latex.

The graft polymer latex was coagulated, aged, washed, dehydrated, and dried to prepare a graft polymer powder.

<Preparation of Thermoplastic Resin Composition>

27.5 parts by weight of the graft polymer powder and 72.5 parts by weight of a vinyl-based non-grafted polymer (styrene/acrylonitrile polymer, 92 HR of LG Chem Ltd.) were mixed to prepare a thermoplastic resin composition.

EXAMPLE 2

A diene-based rubbery polymer, a graft polymer, and a thermoplastic resin composition were prepared in the same manner as in Example 1, except that 0.30 parts by weight of N,N,N', N'-tetramethylethylenediamine was added instead of 0.03 parts by weight of N,N,N',N'-tetramethylethylenediamine in Example 1.

EXAMPLE 3

A diene-based rubbery polymer, a graft polymer, and a thermoplastic resin composition were prepared in the same manner as in Example 1, except that 0.70 parts by weight of N,N,N', N'-tetramethylethylenediamine was added instead of 0.03 parts by weight of N,N,N',N'-tetramethylethylenediamine in Example 1.

EXAMPLE 4

A diene-based rubbery polymer, a graft polymer, and a thermoplastic resin composition were prepared in the same manner as in Example 1, except that 0.30 parts by weight of ethylenediamine was added instead of 0.03 parts by weight of N,N,N',N'-tetramethylethylenediamine in Example 1.

EXAMPLE 5

A diene-based rubbery polymer, a graft polymer, and a thermoplastic resin composition were prepared in the same manner as in Example 1, except that 0.30 parts by weight of dimethylamine was added instead of 0.03 parts by weight of N,N,N',N'-tetramethylethylenediamine in Example 1.

COMPARATIVE EXAMPLE 1

<Preparation of Diene-Based Rubbery Polymer>

55 parts by weight of ion-exchanged water, 70 parts by weight of 1,3-butadiene, 0.3 parts by weight of potassium persulfate, 1.0 part by weight of potassium rosinate, 1.0 part by weight of potassium oleate, 1.5 parts by weight of potassium carbonate, and 0.5 parts by weight of t-dodecyl mercaptan were added into a nitrogen-purged reactor. Then, the temperature of the reactor was raised to 70° C., the pressure of the reactor was set to 8 kg/$cm^2$, and then polymerization was initiated. The polymerization was performed while raising the temperature of the reactor at a constant rate to 80° C. at the same time as the polymerization was initiated. When a polymerization conversion rate was 20%, 30 parts by weight of 1,3-butadiene and 0.2 parts by weight of potassium rosinate were added, and then polymerized. At the time when the polymerization conversion rate was 50%, the temperature of the reactor was raised to 85° C., the polymerization was performed for 10 hours, and the polymerization was terminated to prepare a diene-based rubbery polymer latex.

<Preparation of Graft Polymer>

A monomer mixture comprising 30 parts by weight of styrene, 10 parts by weight of acrylonitrile, 100 parts by weight of ion-exchanged water, 0.05 parts by weight of t-butyl hydroperoxide, 0.5 parts by weight of potassium rosinate, and 0.5 parts by weight of t-dodecyl mercaptan was prepared.

Then, an activator mixture comprising 0.0100 parts by weight of dextrose, 0.0100 parts by weight of tetrasodium pyrophosphate, and 0.0010 parts by weight of iron (II) sulfate was prepared.

60 parts by weight (based on solid content) of the diene-based rubbery polymer latex and 10 parts by weight of ion-exchanged water were added into a nitrogen-purged reactor, and then the temperature of the reactor was raised to 55° C. Polymerization was performed while continuously adding the monomer mixture and the activator mixture into the reactor for 2 hours. After the continuous addition was completed, 0.0050 parts by weight of dextrose, 0.0050 parts by weight of tetrasodium pyrophosphate, 0.0005 parts by weight of iron (II) sulfate and 0.1 parts by weight of t-butyl hydroperoxide were added into the reactor, and the temperature of the reactor was raised to 80° C. for 1 hour, and then the polymerization was terminated to prepare a graft polymer latex.

The graft polymer latex was coagulated, aged, washed, dehydrated, and dried to prepare a graft polymer powder.

<Preparation of Thermoplastic Resin Composition>

27.5 parts by weight of the graft polymer powder and 72.5 parts by weight of a vinyl-based non-grafted polymer (styrene/acrylonitrile polymer, 92 HR of LG Chem Ltd.) were mixed to prepare a thermoplastic resin composition.

COMPARATIVE EXAMPLE 2

<Preparation of Diene-Based Rubbery Polymer>

55 parts by weight of ion-exchanged water, 70 parts by weight of 1,3-butadiene, 0.05 parts by weight of t-butyl hydroperoxide, 0.0080 parts by weight of dextrose, 0.0800 parts by weight of tetrasodium pyrophosphate, 0.0080 parts by weight of iron (II) sulfate, 1.0 part by weight of potassium rosinate, 1.0 part by weight of potassium oleate, 1.5 parts by weight of potassium carbonate, and 0.5 parts by weight of t-dodecyl mercaptan were added into a nitrogen-purged reactor. Then, the temperature of the reactor was raised to 70° C., the pressure of the reactor was set to 8 kg/$cm^2$, and then polymerization was initiated. The polymerization was performed while raising the temperature of the reactor at a constant rate to 80° C. at the same time as the polymerization was initiated. When a polymerization conversion rate was 20%, 30 parts by weight of 1,3-butadiene and 0.2 parts by weight of potassium rosinate were added, and then polymerized. At the time when the polymerization conversion rate was 50%, the temperature of the reactor was raised to 85° C., the polymerization was performed for 10 hours, and the polymerization was terminated to prepare a diene-based rubbery polymer latex.

<Preparation of Graft Polymer>

A monomer mixture comprising 30 parts by weight of styrene, 10 parts by weight of acrylonitrile, 100 parts by weight of ion-exchanged water, 0.05 parts by weight of t-butyl hydroperoxide, 0.5 parts by weight of potassium rosinate, and 0.5 parts by weight of t-dodecyl mercaptan was prepared.

Then, an activator mixture comprising 0.0100 parts by weight of dextrose, 0.0100 parts by weight of tetrasodium pyrophosphate, and 0.0010 parts by weight of iron (II) sulfate was prepared.

60 parts by weight (based on solid content) of the diene-based rubbery polymer latex and 10 parts by weight of ion-exchanged water were added into a nitrogen-purged reactor, and then the temperature of the reactor was raised to 55° C. Polymerization was performed while continuously adding the monomer mixture and the activator mixture into the reactor for 2 hours. After the continuous addition was completed, 0.0050 parts by weight of dextrose, 0.0050 parts by weight of tetrasodium pyrophosphate, 0.0005 parts by weight of iron (II) sulfate, and 0.1 parts by weight of t-butyl hydroperoxide were added into the reactor, and the temperature of the reactor was raised to 80° C. for 1 hour, and then the polymerization was terminated to prepare a graft polymer latex.

The graft polymer latex was coagulated, aged, washed, dehydrated, and dried to prepare a graft polymer powder.

<Preparation of Thermoplastic Resin Composition>

27.5 parts by weight of the graft polymer powder and 72.5 parts by weight of a vinyl-based non-grafted polymer (styrene/acrylonitrile polymer, 92 HR of LG Chem Ltd.) were mixed to prepare a thermoplastic resin composition.

COMPARATIVE EXAMPLE 3

An attempt was made to prepare a diene-based rubbery polymer in the same manner as in Example 1, except that 0.02 parts by weight of N,N,N', N'-tetramethylethylenediamine was added instead of 0.03 parts by weight of N,N,N',N'-tetramethylethylenediamine in Example 1, but polymerization could be not initiated and performed. In order to initiate the polymerization, the temperature of the reactor was raised to 50° C., but the polymerization could not be initiated.

COMPARATIVE EXAMPLE 4

A diene-based rubbery polymer, a graft polymer, and a thermoplastic resin composition were prepared in the same manner as in Example 1, except that 0.71 parts by weight of N,N,N', N'-tetramethylethylenediamine was added instead of 0.03 parts by weight of N,N,N',N'-tetramethylethylenediamine in Example 1.

COMPARATIVE EXAMPLE 5

A diene-based rubbery polymer, a graft polymer, and a thermoplastic resin composition were prepared in the same manner as in Example 1, except that 0.80 parts by weight of N,N,N', N'-tetramethylethylenediamine was added instead of 0.03 parts by weight of N,N,N',N'-tetramethylethylenediamine in Example 1.

COMPARATIVE EXAMPLE 6

A diene-based rubbery polymer, a graft polymer, and a thermoplastic resin composition were prepared in the same manner as in Example 1, except that, in Example 1, 0.03 parts by weight of N,N,N', N'-tetramethylethylenediamine was not added before the initiation of polymerization, and was added after 3 hours had elapsed after the temperature of the reactor was raised to 25° C. Polymerization was initiated from the time when N,N,N', N'-tetramethylethylenediamine was added.

COMPARATIVE EXAMPLE 7

An attempt was made to prepare a diene-based rubbery polymer, a graft polymer, and a thermoplastic resin composition in the same manner as in Example 1, except that, in Example 1, azobisisobutyronitrile (ABIN) was added instead of potassium persulfate, but polymerization could not be initiated at 25° C. In order to initiate the polymerization, the temperature of the reactor was raised to 50° C., but the polymerization could not be initiated.

COMPARATIVE EXAMPLE 8

An attempt was made to prepare a diene-based rubbery polymer, a graft polymer, and a thermoplastic resin composition in the same manner as in Example 1, except that, in Example 1, t-butyl hydroperoxide was added instead of potassium persulfate, but since an oxidation-reduction-based catalyst was not added, polymerization could not be initiated at 25° C. In order to initiate the polymerization, the temperature of the reactor was raised to 50° C., but the polymerization could not be initiated.

COMPARATIVE EXAMPLE 9

An attempt was made to prepare a diene-based rubbery polymer, a graft polymer, and a thermoplastic resin composition in the same manner as in Example 1, except that, in Example 1, tris(2-ethylhexyl)amine was added instead of N,N,N',N'-tetramethylethylenediamine, but polymerization could not be initiated at 25° C. In order to initiate the polymerization, the temperature of the reactor was raised to 50° C., but the polymerization could not be initiated.

EXPERIMENTAL EXAMPLE 1

When the diene-based rubbery polymers of Examples and Comparative Examples were prepared, the maximum polymerization pressure ($kg/cm^2$) applied to the reactor was measured, and the results are shown in Tables 1 to 3 below. Here, the maximum polymerization pressure means when the internal pressure of the reactor during polymerization is the highest.

EXPERIMENTAL EXAMPLE 2

Physical properties of the diene-based rubbery polymers of Examples and Comparative Examples were measured by the methods described below, and the results are shown in Tables 1 to 3 below.

1) Average particle diameter (nm): measured with Nicomp 380 equipment of Particle Sizing Systems using dynamic light scattering method.

2) Gel content (% by weight): Diene-based rubbery polymer latex was coagulated with a dilute aqueous solution of sulfuric acid and then washed. The washed material was primarily dried in a vacuum oven at 60° C. for 24 hours. Then, the primarily dried material was finely cut with scissors to make sections. 1 g of the sections was put in 100 g of toluene, stored in a dark room at 23° C. for 48 hours, and then separated into a sol and a gel. After secondary drying of the gel in an oven at 85° C. for 6 hours, the secondarily dried material was weighed, and gel content was calculated by introducing it into the following equation:

Gel content (% by weight)=(weight of secondarily dried material)/(weight of section used in preparing secondarily dried material)×100

3) Coagulum (% by weight): After filtering the diene-based rubbery polymer latex through a 100-mesh wire mesh, a reaction product that did not pass through the wire mesh was dried in a hot air dryer at 100° C. for 1 hour to measure the weight of the coagulum, and a coagulum content was calculated by introducing it into the following formula.

$$\text{Coagulum content (\% by weight)} = \{(\text{weight of coagulum (g)})/(\text{total weight of reaction product (g)})\} \times 100$$

EXPERIMENTAL EXAMPLE 3

Pellets were prepared by extruding the thermoplastic resin compositions of Examples and Comparative Examples, and specimens were prepared by injecting the pellets. A physical property of the specimens was measured by the method described below, and the results are shown in Tables 1 to 3 below.

1) Impact strength (kgf cm/cm, ¼ In): measured according to ASTM D256 at 25° C.

TABLE 1

| Classification | | | Example 1 | Example 2 | Example 3 | Example 4 | Example 5 |
|---|---|---|---|---|---|---|---|
| Preparation of diene-based rubbery polymer | Amine-based compound | Type | TMEDA | TMEDA | TMEDA | EDA | DMA |
| | | Content (parts by weight) | 0.03 | 0.30 | 0.70 | 0.30 | 0.30 |
| | | addition point (polymerization conversion rate, %) | 0 | 0 | 0 | 0 | 0 |
| | Initiator | Type | KPS | KPS | KPS | KPS | KPS |
| | | Content (parts by weight) | 0.30 | 0.30 | 0.30 | 0.30 | 0.30 |
| | Polymerization initiation temperature (° C.) | | 25 | 25 | 25 | 25 | 25 |
| | Polymerization temperature (° C.) | | 35 | 35 | 35 | 35 | 35 |
| | Maximum polymerization pressure | | 8.4 | 8.4 | 8.5 | 8.5 | 8.4 |
| Diene-based rubbery polymer | Average particle diameter (nm) | | 310 | 310 | 310 | 310 | 310 |
| | Gel content (% by weight) | | 69 | 68 | 71 | 70 | 69 |
| | Coagulum (% by weight) | | 0.007 | 0.008 | 0.011 | 0.008 | 0.009 |
| Specimen | Impact strength (kg · cm/cm) | | 34.5 | 34.1 | 34.3 | 34.1 | 34.1 |

TMEDA: N,N,N',N'-Tetramethylethylenediamine
EDA: Ethylenediamine
DMA: Dimethylamine
KPS: Potassium persulfate

TABLE 2

| Classification | | | Comparative Example 1 | Comparative Example 2 | Comparative Example 3 | Comparative Example 4 | Comparative Example 5 |
|---|---|---|---|---|---|---|---|
| Preparation of diene-based rubbery polymer | Amine-based compound | Type | — | — | TMEDA | TMEDA | TMEDA |
| | | Content (parts by weight) | 0 | 0 | 0.02 | 0.71 | 0.80 |
| | | addition point (polymerization conversion rate, %) | — | — | 0 | 0 | 0 |
| | Initiator | Type | KPS | t-BHP | KPS | KPS | KPS |
| | | Content (parts by weight) | 0.30 | 0.50 | 0.30 | 0.30 | 0.30 |
| | Polymerization initiation temperature (° C.) | | 70 | 70 | Polymerization× | 25 | 25 |
| | Polymerization temperature (° C.) | | 80 | 80 | Polymerization× | 35 | 35 |
| | Maximum polymerization pressure | | 13.5 | 9.0 | Polymerization× | 8.5 | 8.5 |
| Diene-based rubbery polymer | Average particle diameter (nm) | | 310 | 280 | Polymerization× | 295 | 310 |
| | Gel content (% by weight) | | 85 | 67 | Polymerization× | 66 | 66 |
| | Coagulum (% by weight) | | 0.012 | 0.080 | — | 0.100 | 0.120 |
| Specimen | Impact strength (kg · cm/cm) | | 29.1 | 29.5 | — | 32.4 | 33.1 |

TMEDA: N,N,N',N'-Tetramethylethylenediamine
EDA: Ethylenediamine
DMA: Dimethylamine
KPS: Potassium persulfate
t-BHP: t-butyl hydroperoxide

TABLE 3

| Classification | | | Comparative Example 6 | Comparative Example 7 | Comparative Example 8 | Comparative Example 9 |
|---|---|---|---|---|---|---|
| Preparation of diene-based rubbery polymer | Amine-based compound | Type | TMEDA | TMEDA | TMEDA | TEA |
| | | Content (parts by weight) | 0.30 | 0.30 | 0.30 | 0.30 |
| | | addition point (polymerization conversion rate, %) | After raising a temperature of a reactor to 25° C., 3 hours have elapsed | 0 | 0 | 0 |
| | Initiator | Type | KPS | ABIN | t-BHP | KPS |
| | | Content (parts by weight) | 0.30 | 0.30 | 0.05 | 0.30 |
| | Polymerization initiation temperature (° C.) | | 25 | Polymerization× | Polymerization× | Polymerization× |
| | Polymerization temperature (° C.) | | 35 | Polymerization× | Polymerization× | Polymerization× |
| | Maximum polymerization pressure | | 10.4 | Polymerization× | Polymerization× | Polymerization× |
| Diene-based rubbery polymer | Average particle diameter (nm) | | 212 | Polymerization× | Polymerization× | Polymerization× |
| | Gel content (% by weight) | | 75 | Polymerization× | Polymerization× | Polymerization× |
| | Coagulum (% by weight) | | 0.500 | — | — | — |
| Specimen | Impact strength (kg · cm/cm) | | — | — | — | — |

TMEDA: N,N,N',N'-Tetramethylethylenediamine
EDA: Ethylenediamine
DMA: Dimethylamine
KPS: Potassium persulfate
ABIN: Azobisisobutyronitrile
t-BHP: t-butyl hydroperoxide Referring to Tables 1 to 3, Examples 1 to 3 in which polymerization of diene-based monomers was initiated in the presence of N,N,N',N'-tetramethylethylenediamine and potassium persulfate had a polymerization initiation temperature of 25° C. In Examples 1 to 3, polymerization stability was excellent, resulting in less coagulum, the average particle diameter of the diene-based rubbery polymer was appropriate, and specimens had excellent impact resistance. However, as a content of N,N,N',N'-tetramethylethylenediamine increased, the polymerization stability decreased somewhat and a content of coagulum increased. In Example 4 in which polymerization of diene-based monomers was initiated in the presence of ethylenediamine and potassium persulfate, the polymerization initiation temperature was 25° C. Since Example 4 had excellent polymerization stability, less coagulum was generated, an average particle diameter of the diene-based rubbery polymer was appropriate, and impact resistance of the specimen was excellent.

In Example 5 in which polymerization of diene-based monomers was initiated in the presence of dimethylamine and potassium persulfate, the polymerization initiation temperature was 25° C. Since Example 5 had excellent polymerization stability, less coagulum was generated, an average particle diameter of the diene-based rubbery polymer was appropriate, and impact resistance of the specimen was excellent.

Meanwhile, Comparative Example 1 in which polymerization of diene-based monomers was initiated in presence of potassium persulfate without the presence of an amine-based compound had a polymerization initiation temperature of 70° C. Since Comparative Example 1 had high polymerization initiation and performance temperatures, the maximum polymerization pressure was high, and polymerization stability was lowered and an excessive amount of coagulum was generated, compared to Examples 2, 4, and 5 in which potassium persulfate was added in the same content. In addition, the average particle diameter of the diene-based rubbery polymer was equivalent to that of Examples 2, 4, and 5, but the impact resistance of the specimen was remarkably reduced.

In Comparative Example 2 in which polymerization of diene-based monomers was initiated in the presence of t-butyl hydroperoxide and an oxidation-reduction-based catalyst without the presence of an amine-based compound, the polymerization initiation temperature was 70° C. Since Comparative Example 2 had high polymerization initiation and high temperatures, the maximum polymerization pressure was also high. In addition, in Comparative Example 2, polymerization stability was lowered, and coagulum was excessively generated, compared to Examples 1 to 5. In addition, the average particle diameter of the diene-based rubbery polymer was smaller than that of Examples 1 to 5, and the impact strength of specimens was not excellent.

In Comparative Example 3 in which polymerization of diene-based monomers was attempted to be initiated in the presence of 0.02 parts by weight of N,N,N',N'-tetramethylethylenediamine and potassium persulfate, polymerization was not initiated below 35° C.

Comparative Example 4 in which polymerization of diene monomers was initiated in the presence of 0.71 parts by weight of N,N,N', N'-tetramethylethylenediamine and potassium persulfate had a polymerization initiation temperature of 25° C. However, in Comparative Example 4, polymerization stability was lowered, and coagulum was excessively generated, compared to Examples 1 to 5. In Comparative Example 4, the average particle diameter of the diene-based rubbery polymer was smaller than that of Examples 1 to 5, and the impact resistance of specimens was not excellent.

In Comparative Example 5 in which polymerization of diene-based monomers was initiated in the presence of 0.80 parts by weight of N,N,N', N'-tetramethylethylenediamine and potassium persulfate, the polymerization initiation temperature was 25° C. However, in Comparative Example 5, polymerization stability was lowered, and coagulum was excessively generated, compared to Examples 1 to 5. In addition, the average particle diameter of the diene-based rubbery polymer was equivalent to that of Examples 1 to 5, but the impact resistance of specimens was not excellent.

In Comparative Example 6 in which N,N,N',N'-tetramethylethylenediamine was added at the time of 3 hours after the temperature of the reactor was raised to 25° C., polymerization was not initiated before N,N,N',N'-tetramethylethylenediamine was added, but polymerization was initiated only after N,N,N',N'-tetramethylethylenediamine was added. Since the polymerization was initiated late, the polymerization was rapidly performed, which caused the maximum polymerization pressure to increase remarkably. In addition, since the polymerization stability was remarkably lowered, an excessive amount of coagulum was generated. In addition, since the physical properties of the diene-based rubbery polymer were significantly deteriorated due to excessive coagulum, specimens were not prepared to confirm impact resistance.

In Comparative Example 7, Comparative Example 8, and Comparative Example 9, the temperature of the reactor was raised to 50° C. to initiate polymerization, but the polymerization was not initiated in all of them.

The invention claimed is:

1. A method of preparing a diene-based rubbery polymer, comprising initiating and performing polymerization of monomers in the presence of an amine-based compound and a thermal decomposition initiator, wherein the amine-based compound includes one or more selected from a compound represented by Chemical Formula 1 or a compound represented by Chemical Formula 2, a content of the amine-based compound is 0.03 to 0.70 parts by weight, based on 100 parts by weight of a total amount of the monomers added during the preparation of the diene-based rubbery polymer, the monomers include a diene-based monomer and optionally a vinyl aromatic monomer, and the polymerization is initiated at 25 to 50° C.,

[Chemical Formula 1]

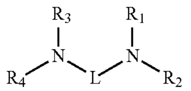

in Chemical Formula 1, $R_1$ to $R_4$ are each independently hydrogen or a $C_1$ to $C_{10}$ alkyl group, L is a $C_1$ to $C_{10}$ alkylene group,

[Chemical Formula 2]

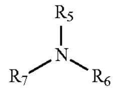

in Chemical Formula 2, $R_5$ to $R_7$ are each independently hydrogen or a $C_1$ to $C_5$ alkyl group, with the proviso that two or more of $R_5$ to $R_7$ are a $C_1$ to $C_5$ alkyl group.

2. The method of preparing a diene-based rubbery polymer of claim 1, wherein the compound represented by Chemical Formula 1 includes one or more selected from N,N,N',N'-tetramethylethylenediamine or ethylenediamine.

3. The method of preparing a diene-based rubbery polymer of claim 1, wherein the compound represented by Chemical Formula 2 includes dimethylamine.

4. The method of preparing a diene-based rubbery polymer of claim 1, wherein the thermal decomposition initiator includes one or more selected from potassium persulfate, sodium persulfate, or ammonium persulfate.

5. The method of preparing a diene-based rubbery polymer of claim 1, wherein the polymerization is initiated at 25 to 35° C.

6. The method of preparing a diene-based rubbery polymer of claim 1, wherein a content of the thermal decomposition initiator is 0.01 to 3.00 parts by weight, based on 100 parts by weight of the total amount of the monomers added during the preparation of the diene-based rubbery polymer.

7. The method of preparing a diene-based rubbery polymer of claim 1, wherein the initiating and performing of the polymerization of the monomers comprises:

initiating the polymerization of the monomers in the presence of the amine-based compound and the thermal decomposition initiator; and adding and further polymerizing the monomers to a polymerization conversion rate of 10 to 50%.

8. The method of preparing a diene-based rubbery polymer of claim 7, wherein a content of the monomers added in the initiating of the polymerization of the monomers is 50 to 90 parts by weight, based on 100 parts by weight of the total amount of the monomers added during the preparation of the diene-based rubbery polymer, and a content of the monomers added in the adding and further polymerizing is 10 to 50 parts by weight, based on 100 parts by weight of the total amount of the monomers added during the preparation of the diene-based rubbery polymer.

9. The method of preparing a diene-based rubbery polymer of claim 1, wherein the polymerization is emulsion polymerization.

10. A method of preparing a graft polymer, comprising:

preparing the diene-based rubbery polymer obtained by the method of claim 1; and polymerizing the vinyl aromatic monomer and a vinyl cyanide-based monomer with the diene-based rubbery polymer.

11. The method of preparing a diene-based rubbery polymer of claim 1, wherein the diene-based monomer is 1,3-butadiene.

12. The method of preparing a diene-based rubbery polymer of claim 11, wherein the compound represented by Chemical Formula 1 includes N,N,N',N'-tetramethylethylenediamine.

13. The method of preparing a diene-based rubbery polymer of claim 11, wherein the compound represented by Chemical Formula 1 includes ethylenediamine.

14. The method of preparing a diene-based rubbery polymer of claim 12, wherein the thermal decomposition initiator includes potassium persulfate.

15. The method of preparing a graft polymer of claim 10, wherein the vinyl aromatic monomer includes styrene.

16. The method of preparing a graft polymer of claim 15, wherein the vinyl cyanide-based monomer includes acrylonitrile.

* * * * *